United States Patent
Sun et al.

(10) Patent No.: US 7,997,062 B2
(45) Date of Patent: Aug. 16, 2011

(54) DUAL CHANNEL REGULATED FUEL-OIL HEAT EXCHANGER

(75) Inventors: Ju Sun, Mississauga (CA); Brian Lee, Scarborough (CA); Adam Logan, Hamilton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 379 days.

(21) Appl. No.: 12/361,992

(22) Filed: Jan. 29, 2009

(65) Prior Publication Data

US 2010/0186943 A1    Jul. 29, 2010

(51) Int. Cl.
*F02K 99/00* (2009.01)
(52) U.S. Cl. .............. 60/266; 60/39.08; 60/734
(58) Field of Classification Search .......... 60/39.08, 60/266, 267, 734; 184/6.11
See application file for complete search history.

(56) References Cited

U.S. PATENT DOCUMENTS

| | | | |
|---|---|---|---|
| 3,300,965 A * | 1/1967 | Sherlaw et al. | 60/39.08 |
| 4,041,697 A * | 8/1977 | Coffinberry et al. | 60/39.281 |
| 4,104,873 A * | 8/1978 | Coffinberry | 60/39.281 |
| 4,696,156 A * | 9/1987 | Burr et al. | 60/39.08 |
| 4,773,212 A * | 9/1988 | Griffin et al. | 60/772 |
| 5,423,174 A * | 6/1995 | Mouton | 60/39.093 |
| 6,182,435 B1 * | 2/2001 | Niggemann et al. | 60/772 |
| 2008/0110596 A1 * | 5/2008 | Schwarz et al. | 165/104.11 |
| 2010/0107603 A1 * | 5/2010 | Smith | 60/267 |

* cited by examiner

*Primary Examiner* — Michael Cuff
*Assistant Examiner* — Phutthiwat Wongwian
(74) *Attorney, Agent, or Firm* — Norton Rose Or LLP

(57) ABSTRACT

A gas turbine engine includes a fuel-oil heat exchange system in which the fuel is continuously heated by a primary hot oil flow in a primary fuel-oil heat exchanger and the fuel is selectively heated in a secondary fuel-oil heat exchanger by a secondary hot oil flow selectively passing through or bypassing a secondary fuel-oil heat exchanger, controlled by a thermal valve.

17 Claims, 4 Drawing Sheets

DUAL CHANNEL REGULATED FUEL-OIL HEAT EXCHANGER

TECHNICAL FIELD

The application relates generally to a gas turbine engine and more particularly, to a fuel-oil heat exchanging system of a gas turbine engine.

BACKGROUND OF THE ART

A fuel-oil heat exchange (FOHE) system is often provided in aircraft gas turbine engines to exchange heat between the cold fuel and hot oil, in order to cool the hot oil and heat the cold fuel prior to combustion, which enhances engine efficiency. In prior art FOHE systems, a single FOHE is usually provided in a fixed size. A main hot oil flow goes through the sole FOHE at all times, regardless of fuel temperatures, when the fuel flow is discharged from a fuel control unit (FCU) and delivered for combustion. However, an engine heat management system requires different conditions during engine operation. For example, an engine without heat transfer to the aircraft fuel tank via motive flow, requires a relatively larger FOHE during take off conditions than during altitude cruise conditions. It is also known in the art that contamination may occur in an oil system of gas turbine engines and said contamination may block the relatively narrow passages within an FOHE system, thereby blocking the entire oil system. Therefore, a conventional FOHE system may be entirely bypassed by a bypass valve which opens only when the FOHE becomes blocked. When the bypass valve is open, the entire FOHE system does not function and the heat exchange between the hot oil and the cold fuel does not take place. Therefore, there is a need to provide an improved fuel oil heat exchange system for gas turbine engines.

SUMMARY

In one aspect, there is provided a gas turbine engine having a fuel-oil heat exchange system, the system comprising a primary fuel-oil heat exchanger; a secondary fuel-oil heat exchanger; a primary oil passage for directing a primary hot oil flow to pass through the primary fuel-oil heat exchanger; a secondary oil passage for selectively directing a secondary hot oil flow to pass through the secondary fuel-oil heat exchanger, the primary oil passage and the secondary oil passage being connected in a parallel relationship one to another; a bypass oil passage for selectively directing the secondary hot oil flow to bypass the secondary fuel-oil heat exchanger; a thermal valve connecting the bypass oil passage to the secondary oil passage upstream of the secondary fuel-oil heat exchanger, the thermal valve being switchable between a first position in which the bypass oil passage is closed and the secondary hot oil flow is directed to pass through the secondary fuel-oil heat exchanger and a second position in which the secondary oil passage is closed and the secondary hot oil flow is directed through the bypass oil passage; and a fuel flow connection including the primary and secondary fuel-oil heat exchangers, for directing a fuel flow to pass through the primary and secondary fuel-oil heat exchangers.

In another aspect, there is provided a fuel-oil heat exchange apparatus for a gas turbine engine for heating a fuel flow using heat energy extracted from hot oil of the engine, comprising a primary fuel-oil heat exchanger and a secondary fuel-oil heat exchanger, the primary and secondary fuel-oil heat exchangers being connected in a fuel flow connection for directing the fuel flow; and means for directing a first portion of a main hot oil flow to continuously pass through the primary fuel-oil heat exchanger and for directing a secondary portion of the main hot oil flow to selectively pass through one of the secondary fuel-oil heat exchanger and a bypass oil passage which bypasses the secondary fuel-oil heat exchanger.

In a further aspect, there is provided a method for regulating a temperature of a fuel flow heated by hot oil in a gas turbine engine, comprising steps of a) directing the fuel flow to be heated, to pass through a primary fuel-oil heat exchanger and a secondary fuel-oil heat exchanger; b) directing a primary hot oil flow to continuously pass through the primary fuel-oil heat exchanger in order to continuously heat at least a first portion of the fuel flow; and c) directing a secondary hot oil flow to pass through a selected one of the secondary fuel-oil heat exchanger and a bypass passage which bypasses the secondary fuel-oil heat exchanger, to thereby selectively heat at least a second portion of the fuel flow.

Further details of these and other aspects of the described concept will be apparent from the detailed description and drawings included below.

DESCRIPTION OF THE DRAWINGS

Reference is now made to the accompanying drawings, in which.

DETAILED DESCRIPTION OF THE PREFERRED EMBODIMENTS

Figure 1:
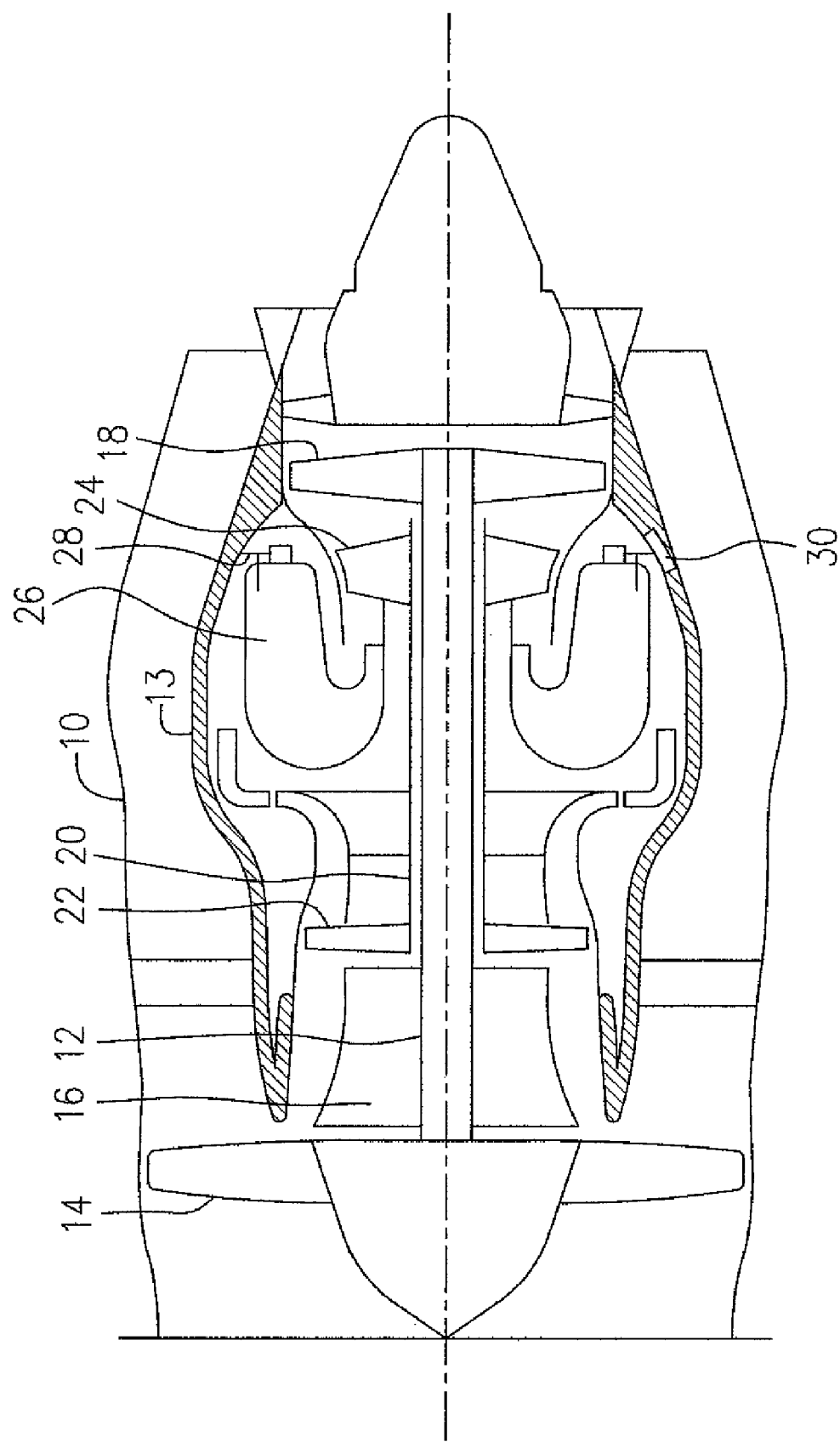
FIG. 1 is a schematic cross-sectional view of a bypass gas turbine engine including the described concept.

Referring to FIG. 1, a bypass gas turbine engine includes a housing or nacelle 10, a core casing 13, a low pressure spool assembly (not numbered) which includes a fan assembly 14, a low pressure compressor assembly 16 and a low pressure turbine assembly 18 connected by a shaft 12, a high pressure spool assembly (not numbered) which includes a high pressure compressor assembly 22 and a high pressure turbine assembly 24 connected by a turbine shaft 20. The core casing 13 surrounds the low and high pressure spool assemblies to define a main flow path therethrough. In the main flow path there is provided a combustion gas generator assembly 26 to generate combustion gases for powering the high and low pressure turbine assemblies 24, 18. There is also provided a fuel supply system 28 including a fuel-oil heat exchange system 30 such that the fuel is heated by hot oil prior to being delivered for combustion in the combustion gas generator assembly 26.

Figure 2:
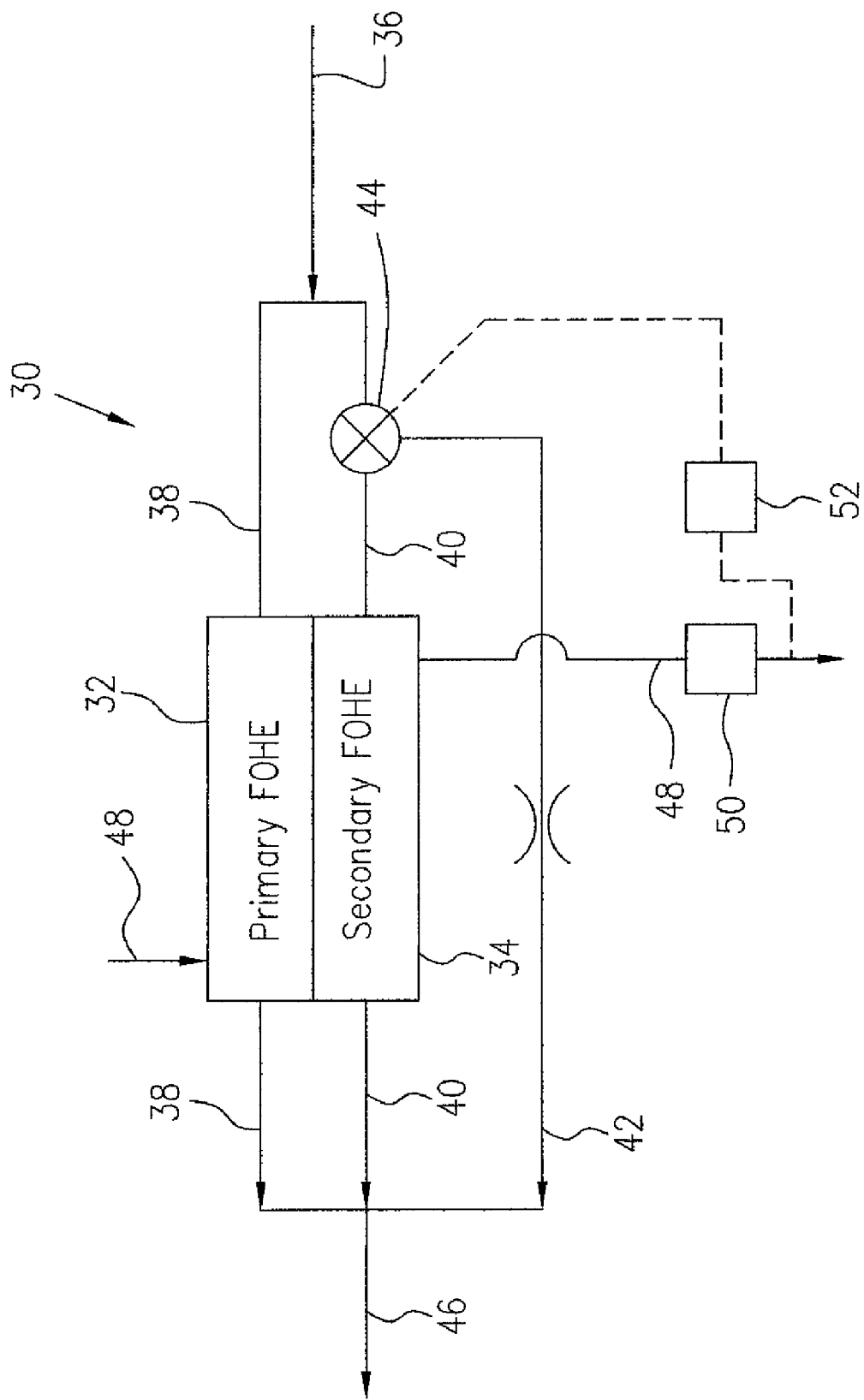
FIG. 2 is a schematic illustration of a duel channel regulated fuel-oil heat exchange system according to one embodiment.

Referring to FIGS. 1 and 2, the fuel-oil heat exchange system 30 includes a primary fuel-oil heat exchanger 32 and a secondary fuel-oil heat exchanger 34. Each of the primary and secondary fuel-oil heat exchangers 32, 34 generally includes separate hot oil passages and cold fuel passages with a heat transferring medium such as common boundary walls shared by both hot oil passages and cold fuel passages, which are well known in the art and will not be described in detail in this application.

The primary and secondary fuel-oil heat exchangers 32 and 34 may be configured to be identical or different either in structure or in size. The fuel-oil heat exchange system 30 further includes a main oil passage 36 in communication with a hot oil source (not illustrated) such as bearing chambers around the engine main shafts 12, 20. The main oil passage 36 diverges into a primary oil passage 38 which passes through the oil passages of the primary fuel-oil heat exchanger 32 and a secondary oil passage 40 which passes through the oil passages of the secondary fuel-oil heat exchanger 34. Therefore, the primary and secondary fuel-oil heat exchangers 32 and 34 are connected in parallel by the primary and secondary oil passages 38 and 40. A first portion of a main oil flow diverted from the main oil passage 36 as a primary hot oil flow, passes through the primary oil passage 38 and the primary fuel-oil heat exchanger 32. A second portion of the main oil flow diverted from the main oil passage 36 as a secondary hot oil flow, passes the secondary oil passage 40 and the secondary fuel-oil heat exchanger 34.

The fuel-oil heat exchange system 30 further includes a bypass oil passage 42 connected to the secondary oil passage 40 at a location upstream of the secondary fuel-oil heat exchanger 34 for selectively directing the secondary hot oil flow to bypass the secondary fuel-oil heat exchanger 34. The primary and secondary oil passages 38, 40 and the bypass oil passage 42 merge at a location downstream of the primary and secondary fuel-oil heat exchangers 32, 34 into a returning oil passage 46 to direct the main oil flow which passes through the fuel-oil heat exchanger system 30 and is thus cooled, for example to an engine oil tank.

A thermal valve 44 is provided to connect the bypass oil passage 42 to the secondary oil passage 40 at the upstream location. The thermal valve 44 is switchable between a first position in which the bypass oil passage 42 is closed and the secondary fuel-oil passage 40 is open for directing the entire volume of the secondary hot oil flow to pass through the secondary fuel-oil passage and then through the secondary fuel-oil heat exchanger 34, and a second position in which the secondary oil passage 40 is closed and the bypass oil passage 42 is open to direct the entire volume of the secondary hot oil flow through the bypass oil passage 42 and to thereby bypass the secondary fuel-oil heat exchanger 34. The cooling of the hot oil flows by the fuel-oil heat exchanger system will be further described below.

The fuel-oil heat exchange system 30 further includes a fuel flow connection (not numbered) through which the fuel-oil heat exchanger system 30 is connected to the fuel supply system 28 of the engine such that cold fuel passes through the fuel-oil heat exchange system 30 in which heat exchange takes place between the cold fuel and hot oil, resulting in warmer fuel and cooler oil, before the fuel is delivered to the combustion gas generator assembly 26 for combustion.

The fuel flow connection of this embodiment includes a fuel passage 48 which passes through the primary and secondary fuel-oil heat exchangers 32, 34 in a serial sequence. The fuel passage 48 may further include a fuel control unit (FCU) 50 at a location downstream of the primary and secondary fuel-oil heat exchangers 32, 34, for metering volumes of the heated fuel to be delivered, for example to fuel nozzles of the combustion gas generator assembly 26.

The thermal valve 44 may be manually or automatically operated between the first and second positions. For example, the thermal valve 44 may be actuated in response to temperature changes of a fuel flow through the fuel passage 48 after passing through the primary and secondary fuel-oil heat exchangers 32, 34. Therefore, there is provided a temperature sensor 52 in this embodiment for sensing the temperature of the fuel flow, for example immediately when discharged from the FCU 50. The thermal valve 44 and the temperature sensor 52 may be preset such that the thermal valve is switched to the first position to allow the entire volume of the secondary hot oil flow to flow through the secondary fuel-oil heat exchanger 34 when the fuel flow temperature at the exit of the FCU 50 is measured below a predetermined low temperature threshold and such that the thermal valve 44 is switched to the second position to allow the entire secondary hot oil flow to go through the bypass passage 42 when the fuel flow temperature measured by the temperature sensor 52 at the exit of the FCU 50 is above a predetermined high temperature threshold.

The primary hot oil flow continuously passes through the primary fuel-oil heat exchanger 32 and thus continuously heats the cold fuel flow passing therethrough. The fuel flow which has been heated by the primary fuel-oil heat exchanger 32 then passes through the secondary fuel-oil heat exchanger 34. However, the fuel flow which has been partially heated by the primary fuel-oil heat exchanger 32, may or may not be further heated by the secondary fuel-oil heat exchanger 34 depending on whether or not the secondary hot oil flow is directed through the secondary fuel-oil heat exchanger 34 or through the bypasss passage 42, which is controlled by the thermal valve in response to the temperature of the fuel flow measured by the temperature sensor 52 at the exit of the fuel control unit 50.

Therefore, the fuel-oil heat exchanger system 30 as a whole heat exchanging system, heats the cold fuel flow (while the cold fuel flow cools the main hot oil flow) at its full capacity when the fuel flow temperature measured by the temperature sensor 52 at the exit of the FCU 50 is below the first predetermined temperature threshold to prevent, for example icing conditions to occur in the fuel system 28 during cold days (resulting in potential fuel blockage to the engine). The fuel-oil heat exchange system 30 as a whole, works at partial capacity with only the primary fuel-oil heat exchanger 32 functioning when the fuel flow temperature measured by the temperature sensor 52 at the exit of the FCU 50 is above the predetermined high temperature threshold and thus the thermal valve 44 directs the entire volume of the secondary hot oil flow to bypass the secondary fuel-oil heat exchanger 34. Therefore, problems caused by high fuel temperatures, for example carbon build-up in the fuel system and fuel boiling occurrences during hot days, may be prevented. It is also understood that the temperature of the oil flow in the oil passage 46 is relatively higher when the fuel-oil heat exchange system 30 works at partial capacity, in contrast to the system 30 working at full capacity.

Optionally, the bypass passage 42 may be configured to have a flow resistance to the secondary hot oil flow in order to create a pressure loss when the secondary hot oil flow passes through the bypass passage 42, similar to a pressure loss caused by the secondary fuel-oil heat exchanger 34 when the secondary hot oil flow passes through the secondary fuel-oil heat exchanger 34. Therefore, the oil circulation in the engine oil system which includes the fuel-oil heat exchange system 30 will not be affected by the working conditions (full or partial capacity) of the fuel-oil heat exchange system 30.

Figure 3:
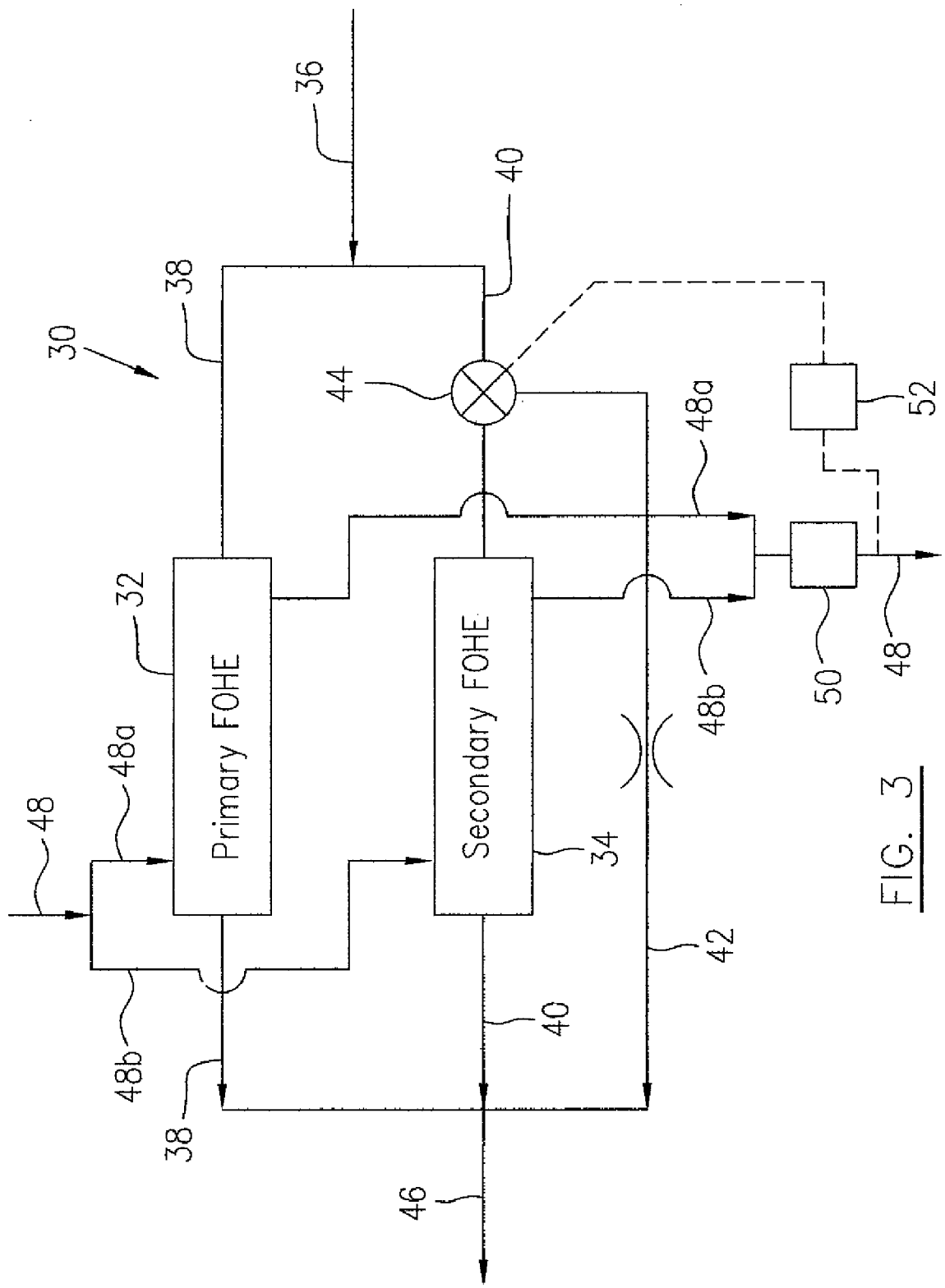
FIG. 3 is a schematic illustration of a duel channel regulated fuel-oil heat exchange system according to another embodiment.

FIG. 3 shows another embodiment similar to the fuel-oil heat exchange system 30. Similar components are indicated by similar numeral references as shown in FIG. 2 and will not be redundantly described. The difference between the embodiments of FIGS. 2 and 3 lies in that the primary and secondary fuel-oil heat exchangers 32, 34 are connected in the fuel flow connection by fuel passage 48 in parallel as shown in FIG. 3, in contrast to the primary and secondary fuel-oil heat exchangers 32, 34 connected by the fuel passage 48 of the fuel flow connection in a serial sequence as shown in FIG. 2.

In the embodiment illustrated in FIG. 3, the fuel passage 48, at a location upstream of the primary and secondary fuel-oil heat exchangers 32, 34 diverges into a first fuel flow branch 48a which goes through the primary fuel-oil heat exchanger 32 and a second fuel flow branch 48b which goes through the secondary fuel-oil heat exchanger 34. At a location downstream of the primary and secondary fuel-oil heat exchangers 32, 34, the fuel branches 48a and 48b merge into a single fuel passage as a continuous part of the fuel passage 48. The merging point of the fuel flow branches 48a and 48b may be located upstream of the FCU 50 to allow the fuel flows through the respective fuel flow branches 48a and 48b to be mixed prior to entering and passing through the FCU 50. The portion of the fuel flow which passes through the fuel branch 48b may have a temperature lower than the temperature of the fuel flow passing through the fuel branch 48a when the secondary fuel-oil heat exchanger 34 does not function by directing the secondary hot oil flow to bypass the secondary fuel oil heating exchanger 34. Therefore, the temperature of the fuel flow to be measured for controlling the operation of the thermal valve 44 must be the temperature of the mixed portions of the fuel flow passing through fuel branches 48a and 48b.

Figure 4:
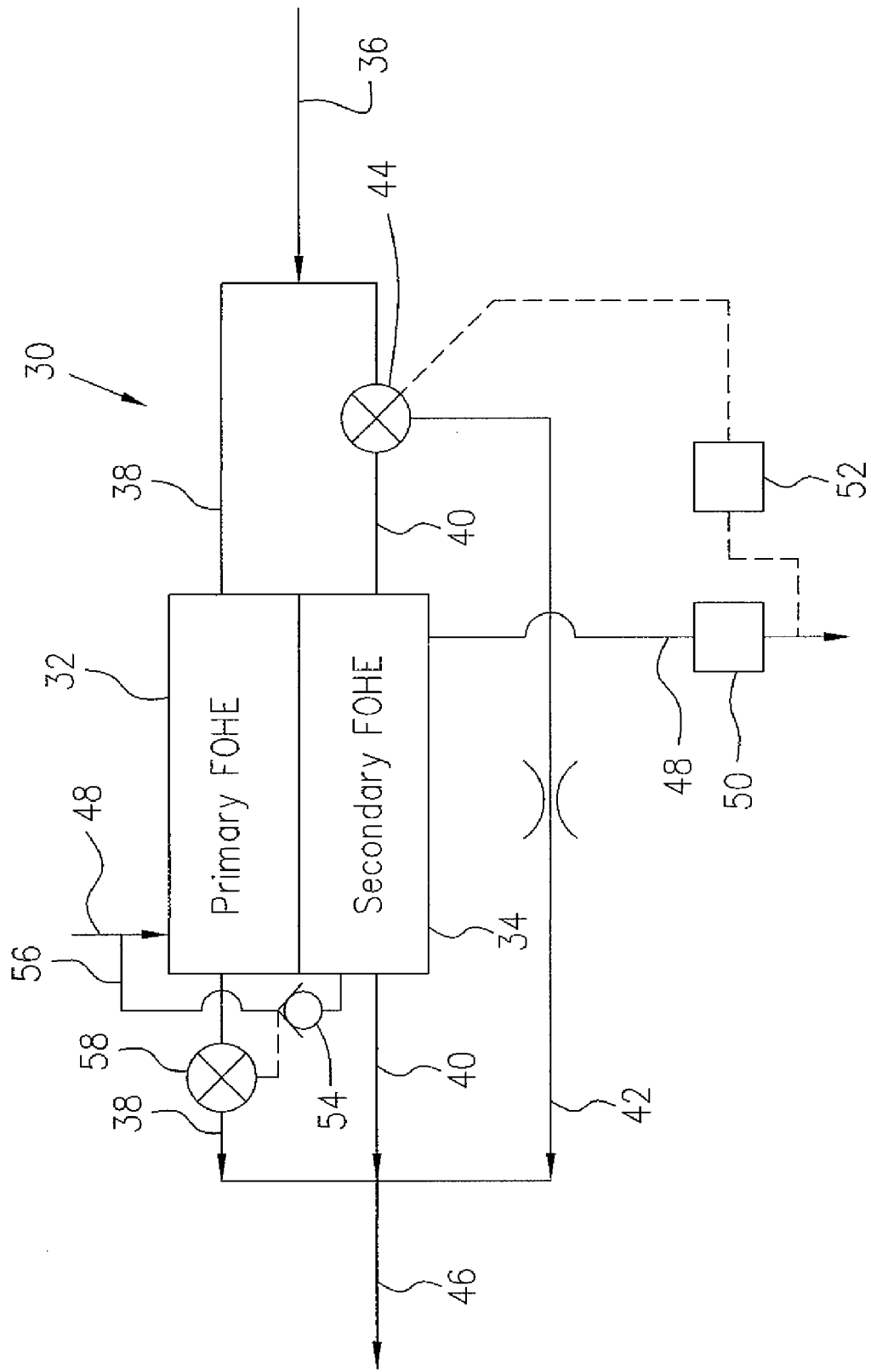
FIG. 4 is a schematic illustration of a further modified embodiment of the duel channel regulated fuel-oil exchange system of FIG. 2.

FIG. 4 shows the fuel-oil heat exchange system 30 further modified from the embodiment of FIG. 2. A check valve 54 is included in a fuel bypass passage 56 which connects the fuel passage 48 and the secondary fuel-oil heat exchanger 34, bypassing the primary fuel-oil heat exchanger 32. The fuel flow to the primary fuel-oil heat exchanger 32 may be blocked when an icing condition occurs, resulting in fuel starvation for the gas turbine engine. In this circumstance, under the increasing fuel pressure, the check valve 54 will be forced open to allow fuel to flow from fuel passage 48 directly to the secondary fuel-oil heat exchanger 34 to avoid the fuel starvation. Optionally, an oil valve 58 may be included in the primary oil passage 38 and controllably connected to the check valve 54 for operation. The oil valve 58 remains in an open position in a normal operation, to allow hot oil flow to pass through the primary fuel-oil heat exchanger 32. When an icing condition occurs and the check valve 54 is open, the check valve 54 can shuttle the oil valve 58 to a closed position in order to direct all volume of hot oil flow to pass through the secondary fuel-oil heat exchanger 34 to maintain a relatively high heat exchange efficiency.

The above description is meant to be exemplary only, and one skilled in the art will recognize that changes may be made to the embodiments described without departing from the scope of the concept disclosed. For example, although a turbofan gas turbine engine is described as an example of the application of this described concept, this concept is also applicable to other gas turbine engines. Still other modifications which fall within the scope of the described concept will be apparent to those skilled in the art, in light of a review of this disclosure, and such modifications are intended to fall within the appended claims.

What is claimed is:

1. An aircraft gas turbine engine having a fuel-oil heat exchange system, the system comprising:
   a primary fuel-oil heat exchanger;
   a secondary fuel-oil heat exchanger;
   a primary oil passage for directing a primary hot oil flow to pass through the primary fuel-oil heat exchanger;
   a secondary oil passage for selectively directing a secondary hot oil flow to pass through the secondary fuel-oil heat exchanger, the primary oil passage and the secondary oil passage being connected in a parallel relationship one to another;
   a bypass oil passage for selectively directing the secondary hot oil flow to bypass the secondary fuel-oil heat exchanger;
   a thermal valve connecting the bypass oil passage to the secondary oil passage upstream of the secondary fuel-oil heat exchanger, the thermal valve being switchable between a first position in which the bypass oil passage is closed and the secondary hot oil flow is directed to pass through the secondary fuel-oil heat exchanger and a second position in which the secondary oil passage is closed and the secondary hot oil flow is directed through the bypass oil passage; and
   a fuel flow connection including the primary and secondary fuel-oil heat exchangers that direct a fuel flow to pass through the primary and secondary fuel-oil heat exchangers and supply to a combustor of the gas turbine engine, wherein the secondary hot oil flow bypasses the secondary fuel-oil heat exchanger according to a temperature change of the fuel flow.

2. The aircraft gas turbine engine as defined in claim 1 wherein the system further comprises a temperature sensor for sensing the temperature of the fuel flow after the fuel flow has passed through the primary and secondary fuel-oil heat exchangers.

3. The aircraft gas turbine engine as defined in claim 2 wherein the fuel flow connection further comprises a fuel control unit disposed downstream of the primary and secondary fuel-oil heat exchangers, and wherein the temperature sensor senses the temperature of the fuel flow discharged from the fuel control unit.

4. The aircraft gas turbine engine as defined in claim 2 wherein the thermal valve is switched between the first and second positions in response to temperature changes sensed by the temperature sensor.

5. The aircraft gas turbine engine as defined in claim 1 wherein the bypass oil passage and the secondary fuel-oil heat exchanger have similar pressure loss characteristics with respect to the secondary hot oil flow.

6. The aircraft gas turbine engine as defined in claim 1 wherein the primary and secondary oil passages are diverged from a main oil passage.

7. The aircraft gas turbine engine as defined in claim 1 wherein the bypass oil passage merges with the primary and secondary oil passages downstream of the respective primary and secondary fuel-oil heat exchangers.

8. The aircraft gas turbine engine as defined in claim 1 wherein the fuel flow in the fuel flow connection passes through the primary and secondary fuel-oil heat exchangers in a serial sequence.

9. The aircraft system as defined in claim 1 wherein the primary fuel-oil heat exchanger and the secondary fuel-oil heat exchanger are connected in parallel in the fuel flow connection.

10. The aircraft gas turbine engine as defined in claim 8 wherein the fuel flow connection comprises a fuel bypass passage including a check valve openable under an increasing fuel pressure resulting from blockage of the fuel flow to the primary fuel-oil heat exchanger, thereby allowing the fuel flow to bypass the primary fuel-oil heat exchanger and directly enter the secondary fuel-oil heat exchanger.

11. The aircraft gas turbine engine as defined in claim 10 wherein the primary oil passage comprises a normal-open oil valve, the oil valve being controllably connected to the check valve to cause a closed position of the oil valve when the check valve is open.

12. An aircraft gas turbine engine having a fuel-oil heat exchange apparatus, the apparatus comprising:
   a primary fuel-oil heat exchanger and a secondary fuel-oil heat exchanger, the primary and secondary fuel-oil heat exchangers being connected in a fuel flow connection to direct the fuel flow to a combustor of the gas turbine engine;
   means for directing a first portion of a main hot oil flow to continuously pass through the primary fuel-oil heat exchanger;
   means for directing a secondary portion of the main hot oil flow to pass through the secondary fuel-oil heat exchanger, means for directing the first portion and means for directing a secondary portion being connected in a parallel relationship one to another; and
   means for directing the secondary portion of the main oil flow to bypass the secondary fuel-oil heat exchanger according to a temperature change of the fuel flow.

13. The aircraft gas turbine engine as defined in claim 12 wherein the means comprise:
   a primary oil passage for directing the first portion of the main hot oil flow to pass through the primary fuel-oil heat exchanger;
   a secondary oil passage for selectively directing the second portion of the main hot oil flow to pass through the secondary fuel-oil heat exchanger, the primary oil passage and the secondary oil passage being connected in a parallel relation one to another;
   a bypass oil passage for selectively directing the second portion of the main hot oil flow to bypass the secondary fuel-oil heat exchanger; and
   a thermal valve connecting the bypass oil passage to the secondary oil passage upstream of the secondary fuel-oil heat exchanger, switchable between a first position in which the bypass oil passage is closed and the second portion of the main hot oil flow is directed to pass through the secondary fuel-oil heat exchanger, and a second position in which the secondary oil passage is closed and the second portion of the main hot oil flow is directed through the bypass oil passage.

14. The aircraft gas turbine engine as defined in claim 13 wherein the bypass oil passage and the secondary fuel-oil heat exchanger have a similar oil flow resistance relative to the second portion of the main hot oil flow.

15. A method for regulating a temperature of a fuel flow heated by hot oil in a gas turbine engine, comprising steps of:
   a) directing the fuel flow to be heated, to pass through a primary fuel-oil heat exchanger and a secondary fuel-oil heat exchanger;
   b) directing a primary hot oil flow to continuously pass through a primary oil passage of the primary fuel-oil heat exchanger in order to continuously heat at least a first portion of the fuel flow; and
   c) directing a secondary hot oil flow to pass through a secondary oil passage of the secondary fuel-oil heat exchanger when a temperature of the heated fuel flow is below a first predetermined temperature and directing the secondary hot oil flow to bypass the secondary fuel-oil heat exchanger when the temperature of the heated fuel flow is above a second predetermined temperature, to thereby selectively heat at least a second portion of the fuel flow in response to temperature changes of the heated fuel flow measured after step (a), wherein the primary oil passage and the secondary oil passage being connected in a parallel relationship one to another.

16. The method as defined in claim 15 wherein step (a) is conducted through a fuel flow connection in which the primary fuel-oil heat exchanger and the secondary fuel-oil heat exchanger are connected in series, thereby the respective at least first portion and at least second portion of the fuel flow in steps (b) and (c) representing an entire volume of the fuel flow.

17. The method as defined in claim 15 wherein step (a) is conducted through a fuel flow connection in which the primary fuel-oil heat exchanger and the secondary fuel-oil heat exchanger are connected in parallel, thereby the sum of the at least first portion and the at least second portion of the fuel flow in steps (b) and (c) representing an entire volume of the fuel flow.

* * * * *